US011595296B2

(12) United States Patent
Selvaraj et al.

(10) Patent No.: US 11,595,296 B2
(45) Date of Patent: Feb. 28, 2023

(54) ACTIVE-ACTIVE SUPPORT OF MULTICAST STREAMS IN VIRTUALIZED ENVIRONMENT

(71) Applicant: VMware, Inc., Palo Alto, CA (US)

(72) Inventors: Meenakshi Sundaram Selvaraj, Pleasanton, CA (US); Anil Lohiya, Cupertino, CA (US); Vijayalaxmi Basavaraj, Cupertino, CA (US); Xinhua Hong, Milpitas, CA (US); Senthilkumar Karunakaran, Santa Clara, CA (US); Stephen Tan, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/362,973

(22) Filed: Jun. 29, 2021

(65) Prior Publication Data
US 2022/0417133 A1    Dec. 29, 2022

(51) Int. Cl.
*H04L 45/16*    (2022.01)
*H04L 45/586*    (2022.01)

(52) U.S. Cl.
CPC ............ *H04L 45/16* (2013.01); *H04L 45/586* (2013.01)

(58) Field of Classification Search
None
See application file for complete search history.

(56) References Cited

U.S. PATENT DOCUMENTS

| 5,079,767 A | 1/1992 | Perlman |
| 5,128,926 A | 7/1992 | Perlman et al. |
| 7,317,722 B2 | 1/2008 | Aquino et al. |
| 7,802,000 B1 | 9/2010 | Huang et al. |
| 7,925,778 B1 | 4/2011 | Wijnands et al. |

(Continued)

FOREIGN PATENT DOCUMENTS

| CN | 101102214 A | 1/2008 |
| CN | 101222346 A | 7/2008 |

(Continued)

OTHER PUBLICATIONS

Non-Published Commonly Owned Related U.S. Appl. No. 17/362,968 with similar specification, filed Jun. 29, 2021, 35 pages, VMware, Inc.

*Primary Examiner* — Xavier S Wong
(74) *Attorney, Agent, or Firm* — Adeli LLP

(57) ABSTRACT

A network system that uses a cluster of edge nodes to send and receive multicast traffic is provided. The network system is a network virtualization environment that includes one or more distributed routers, each distributed router implemented by virtualization software running on one or more host machines. The network system also includes a cluster of edge nodes for sending data from the one or more distributed routers to one or more uplink/upstream physical routers outside of a datacenter and for receiving data from the physical routers to the distributed routers. One of the edge nodes is a designated edge node that queries for membership information for one or more multicast groups to be received by at least two edge nodes of the cluster of edge nodes. The cluster of edge nodes forwards multicast traffic to and from the distributed routers according to the received membership information.

10 Claims, 9 Drawing Sheets

(56) References Cited

U.S. PATENT DOCUMENTS

| | | | |
|---|---|---|---|
| 8,111,633 | B1 | 2/2012 | Aggarwal et al. |
| 8,665,887 | B2 | 3/2014 | Ge et al. |
| 8,908,686 | B1 * | 12/2014 | Ghosh ................ F04D 17/10 |
| | | | 370/390 |
| 9,043,452 | B2 | 5/2015 | Fulton |
| 9,137,045 | B2 * | 9/2015 | Chen .................. H04L 12/185 |
| 9,270,585 | B2 | 2/2016 | Manion et al. |
| 9,432,204 | B2 | 8/2016 | Shen et al. |
| 9,479,348 | B2 | 10/2016 | Sreeramoju et al. |
| 9,602,385 | B2 | 3/2017 | Tessmer et al. |
| 9,692,655 | B2 | 6/2017 | Koponen et al. |
| 9,794,079 | B2 | 10/2017 | Tessmer et al. |
| 10,015,643 | B2 | 7/2018 | Zuniga et al. |
| 10,218,523 | B2 | 2/2019 | Boutros et al. |
| 10,263,884 | B2 | 4/2019 | Kota et al. |
| 10,454,833 | B1 * | 10/2019 | Bosshart ............. H04L 49/3063 |
| 10,503,565 | B2 | 12/2019 | Guo et al. |
| 10,511,548 | B2 | 12/2019 | Liu et al. |
| 10,523,455 | B2 | 12/2019 | Boutros et al. |
| 10,567,187 | B2 | 2/2020 | Mathew et al. |
| 10,873,473 | B2 | 12/2020 | Boutros et al. |
| 10,904,134 | B2 | 1/2021 | Jiang et al. |
| 10,958,462 | B2 | 3/2021 | Boutros et al. |
| 10,979,246 | B2 | 4/2021 | Boutros et al. |
| 2003/0088696 | A1 | 5/2003 | McCanne |
| 2003/0165140 | A1 | 9/2003 | Tang et al. |
| 2004/0258003 | A1 | 12/2004 | Kokot et al. |
| 2009/0147786 | A1 | 6/2009 | Li et al. |
| 2009/0279701 | A1 | 11/2009 | Moisand et al. |
| 2011/0158113 | A1 | 6/2011 | Nanda et al. |
| 2011/0211517 | A1 | 9/2011 | Moscibroda et al. |
| 2012/0033668 | A1 | 2/2012 | Humphries |
| 2013/0044641 | A1 | 2/2013 | Koponen et al. |
| 2013/0051399 | A1 | 2/2013 | Zhang et al. |
| 2013/0058229 | A1 | 3/2013 | Casado et al. |
| 2013/0103817 | A1 | 4/2013 | Koponen et al. |
| 2013/0107699 | A1 | 5/2013 | Miclea |
| 2013/0114466 | A1 | 5/2013 | Koponen et al. |
| 2013/0117428 | A1 | 5/2013 | Koponen et al. |
| 2013/0117429 | A1 | 5/2013 | Koponen et al. |
| 2013/0128886 | A1 | 5/2013 | Shah |
| 2013/0188521 | A1 | 7/2013 | Jain |
| 2013/0287026 | A1 | 10/2013 | Davie |
| 2013/0322443 | A1 | 12/2013 | Dunbar et al. |
| 2014/0064142 | A1 | 3/2014 | Mylarappa et al. |
| 2014/0098815 | A1 | 4/2014 | Mishra et al. |
| 2014/0185613 | A1 | 7/2014 | Sato |
| 2014/0198661 | A1 | 7/2014 | Raman et al. |
| 2014/0328159 | A1 | 11/2014 | Rebella et al. |
| 2015/0009995 | A1 | 1/2015 | Gross, IV et al. |
| 2015/0016286 | A1 | 1/2015 | Ganichev et al. |
| 2015/0016460 | A1 | 1/2015 | Zhang et al. |
| 2015/0016469 | A1 | 1/2015 | Ganichev et al. |
| 2015/0055651 | A1 | 2/2015 | Shen et al. |
| 2015/0055652 | A1 | 2/2015 | Yong et al. |
| 2015/0058968 | A1 | 2/2015 | Wang et al. |
| 2015/0063364 | A1 | 3/2015 | Thakkar et al. |
| 2015/0103843 | A1 | 4/2015 | Chandrashekhar et al. |
| 2015/0139238 | A1 | 5/2015 | Pourzandi et al. |
| 2015/0263899 | A1 | 9/2015 | Tubaltsev et al. |
| 2015/0281125 | A1 | 10/2015 | Koponen et al. |
| 2016/0092257 | A1 | 3/2016 | Wang et al. |
| 2016/0092259 | A1 | 3/2016 | Mehta et al. |
| 2016/0094365 | A1 | 3/2016 | Subramaniyam et al. |
| 2016/0094366 | A1 | 3/2016 | Wang et al. |
| 2016/0094396 | A1 | 3/2016 | Chandrashekhar et al. |
| 2016/0094398 | A1 | 3/2016 | Choudhury et al. |
| 2016/0105333 | A1 | 4/2016 | Lenglet et al. |
| 2016/0226671 | A1 | 8/2016 | Lemoine |
| 2016/0241410 | A1 | 8/2016 | Lemoine |
| 2019/0020490 | A1 | 1/2019 | Boutros et al. |
| 2019/0020491 | A1 | 1/2019 | Boutros et al. |
| 2019/0020492 | A1 | 1/2019 | Boutros et al. |
| 2019/0182061 | A1 | 6/2019 | Boutros et al. |
| 2020/0036646 | A1 | 1/2020 | Mathew et al. |
| 2020/0067818 | A1 | 2/2020 | Jeuk et al. |
| 2020/0067819 | A1 | 2/2020 | Basavaraj et al. |
| 2021/0111914 | A1 | 4/2021 | Boutros et al. |
| 2021/0126866 | A1 | 4/2021 | Mathew et al. |
| 2021/0218684 | A1 | 7/2021 | Rekhate et al. |
| 2022/0045875 | A1 * | 2/2022 | Zhou ................... H04L 45/20 |

FOREIGN PATENT DOCUMENTS

| | | |
|---|---|---|
| CN | 104243323 A | 12/2014 |
| CN | 104426681 A | 3/2015 |
| CN | 105684363 A | 6/2016 |
| CN | 106165358 A | 11/2016 |
| CN | 106850878 A | 6/2017 |
| EP | 1876766 A1 | 1/2008 |
| GB | 2529705 A | 3/2016 |
| WO | 2015054671 A2 | 4/2015 |
| WO | 2015142404 A1 | 9/2015 |
| WO | 2019018261 A1 | 1/2019 |

\* cited by examiner

ACTIVE-ACTIVE SUPPORT OF MULTICAST STREAMS IN VIRTUALIZED ENVIRONMENT

BACKGROUND

Multicast is group communication in computer networking where data transmission is addressed to a group of destination computers simultaneously. Multicast can be one-to-many or many-to-many distribution. Group communication makes it possible for the source to efficiently send to the group in a single transmission. Copies are automatically created in network elements such as routers, switches, and cellular network base stations, but only to network segments that currently contain members of the group. Multicast protocols such as Internet Group Management Protocol (IGMP) and Protocol Independent Multicast (PIM) are used to setup the forwarding state in routers based on the information exchanged about the senders and the receivers of multicast traffic.

IGMP operates on the network layer and is used by hosts and adjacent routers on IPv4 networks to establish multicast group memberships. PIM provide one-to-many and many-to-many distribution of data over local area network (LAN), wide area network (WAN), or the Internet. IGMP operates between a host and a local multicast router. Switches featuring IGMP snooping derives useful information (e.g., multicast group membership information) by observing these IGMP transactions. PIM protocol is then used between the local and remote multicast routers to direct multicast traffic from host machines sending multicast traffic to hosts that have registered through IGMP to receive the multicast traffic. The IGMP protocol may be implemented on hosts and within routers. A host requests membership to a group through its local router while a router listens for these requests and periodically sends out subscription queries.

SUMMARY

Some embodiments of the invention provide a network system that uses a cluster of edge nodes to send and receive multicast traffic. The network system is a network virtualization environment that includes one or more distributed routers, each distributed router implemented by virtualization software running on one or more host machines. The network system also includes a cluster of edge nodes for sending data from the one or more distributed routers to one or more uplink/upstream physical routers outside of a datacenter and for receiving data from the physical routers to the distributed routers. One of the edge nodes is a designated edge node that queries for membership information for one or more multicast groups to be received by at least two edge nodes of the cluster of edge nodes. The cluster of edge nodes forwards multicast traffic to and from the distributed routers according to the received membership information.

In some embodiments, the cluster of edge nodes are in a same LAN segment and the designated edge node is the only edge node of the cluster that queries the multicast membership information for the cluster of edge nodes. In some embodiments, the designated edge node sends PIM join to the uplink/upstream physical routers, and converts incoming PIM join from the uplink/upstream physical routers into IGMP join for the edge nodes in the cluster. In some embodiments, a particular distributed router is designated as a logical switch for the cluster of edge nodes and the distributed routers.

In some embodiments, a distributed router uses a look-up table that returns a list of edge nodes in the cluster of edge nodes as available next-hops for forwarding multicast packets to the uplink/upstream physical routers for load balancing or equal cost multipath (ECMP) routing. The look-up table is generated based on the membership information distributed by the designated edge node. In some embodiments, a multicast group identifier is used as a hash key to select an edge node from the list of edge nodes for forwarding the multicast packets to the uplink/upstream physical routers for load balancing. In some embodiments, the edge nodes in the cluster and the distributed routers have an identical list of next-hops for multicast traffic, wherein a multicast group identifier of a multicast packet is used as hash key to select a next-hop from the list of next-hops.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A network virtualization environment (e.g., a virtual network implemented over a physical network using a network virtualization manager such as VMware NSX®) may achieve scaling by deploying a two-level hierarchy of the edge routing services. Such a virtual network system may include provider level (referred to as T0) routers and tenant level (referred to as T1) routers. The T0 routers provide gateway functionalities in and out of the virtual network or datacenter and the T1 routers provide services and resources to tenants. Data compute nodes (DCNs) such as virtual machines (VMs) implemented by virtualization software (or hypervisors) executing in host machines provide the services and resources such as computation and storage. The DCNs are connected to the T1 routers (and some T0 routers). The T0 routers and the T1 routers may both be distributed routers whose functionalities are jointly performed by multiple different host machines in one or more datacenters. Edge nodes in a cluster (e.g., 8 or 16 edge nodes cluster) are used to send S-to-N traffic from the distributed routers (T0 and T1) to one or more uplink/upstream physical routers (outside of datacenter) and for receiving N-to-S traffic from the physical routers to the distributed routers. Multicast senders and the receivers are connected either to the T1 routers in the network virtualization domain (that uses a network virtualization manager to implement the distributed routers and service routers) or to the physical routers in a physical network domain (that do not use network virtualization manager to implement). In some embodiments, the cluster of edge nodes in service routers are used to send multicast traffic from distributed routers to the uplink/upstream physical routers and for receiving multicast traffic from the uplink/upstream physical routers to the distributed routers.

Figure 1:
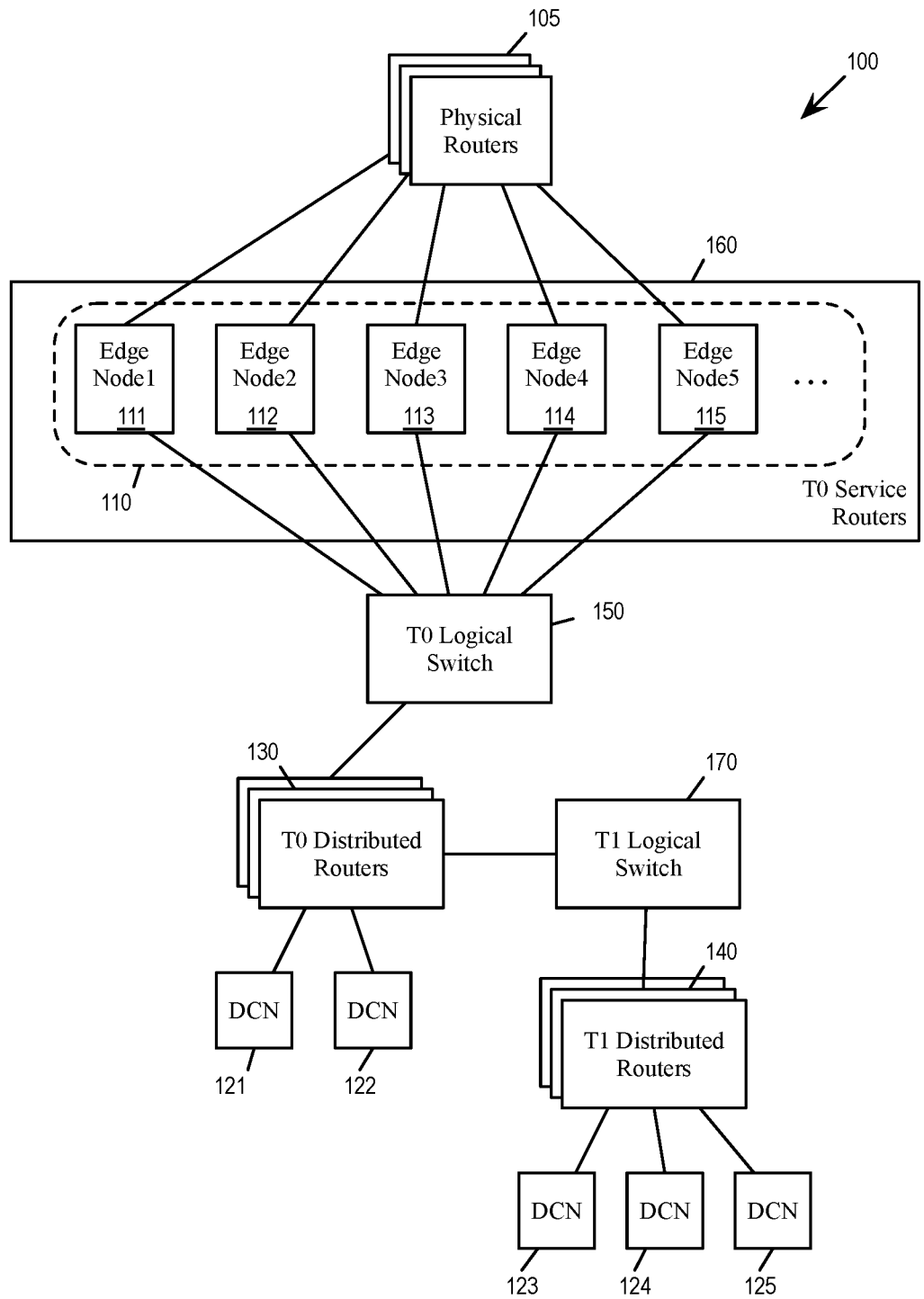
FIG. 1 conceptually illustrates an example network virtualization environment that uses a cluster of edge nodes in service routers to deliver multicast traffic between distributed routers and uplink/upstream physical routers.

FIG. 1 conceptually illustrates an example network virtualization environment that uses a cluster of edge nodes in service routers to deliver multicast traffic between distributed routers and uplink/upstream physical routers. As illustrated, a network virtualization environment 100 includes a cluster of edge nodes 110. The cluster of edge nodes 110 includes edge nodes 111-115 (and several more not illustrated). Each of the edge nodes can be used to send multicast traffic from physical routers 105 toward DCNs 121-125 (N to S traffic) and to send multicast traffic from the DCNs to the physical routers (S to N traffic). The DCNs are connected to one or more distributed routers (DR), including tenant level distributed routers 140 (or T1-DRs) and provider level distributed routers 130 (or T0-DRs). The edge nodes of the cluster 110 are implemented in one or more provider level service routers (or T0-SRs) 160.

A T0 logical switch 150 interconnects the T0 distributed routers 130 and the T0 service routers 160. A T1 logical switch 170 interconnects the T0 distributed routers 130 with the T1 distributed routers 140. Thus, S-to-N data traffic (including multicast traffic) may originate the DCNs 121-125 and be received by the physical routers 105 through the T1 distributed routers 140 and/or T0 distributed routers 130, the T1 logical switch 170 and/or the T0 logical switch 150, and the cluster of edge nodes 110 in the service routers 160. Conversely, the N-to-S data traffic (including multicast traffic) from the physical routers 105 may be received by the DCNs 121-125 through the cluster of edge nodes 110 in the service routers 160, the logical switches 150 and/or 170, and the distributed routers 130 and/or 140.

For some embodiments, multicast protocols such as IGMP, and PIM may run in the T0 routers but not in the T1 routers. IGMP and PIM are soft state protocols that may result in scaling issues due to periodic generation and maintenance of the multicast state. When multicast service is enabled on an edge node in the network virtualization environment 100, it is typically enabled on the cluster of edge nodes 110 to handle the IGMP control plane scaling and the multicast forwarding plane scaling. However, IGMP protocol does not allow multiple queriers on a LAN segment. Thus, when multiple edge nodes are deployed as the cluster of nodes, only one of those edge nodes can be an IGMP querier and receive IGMP reports.

In some embodiments, in order to use multiple edge nodes in a same LAN segment (e.g., some or all edge nodes in the cluster of edge nodes) to receive and send multicast traffic in the network virtualization environment, one of the edge nodes is chosen as a designated edge node. The designated edge node (i) queries (in IGMP protocol) for membership information for one or more multicast groups, (ii) and receives the membership information (e.g., in IGMP report), and (iii) distributes the membership information among the cluster of edge nodes and the distributed routers. This allows multiple or all edge nodes in the cluster to receive the multicast traffic rather than only one edge node. In some embodiments, in the control plane, there is a single IGMP querier across all the edge nodes to send the membership queries. Learning of GMP memberships is achieved via distributed data plane learning.

FIGS. 2*a-d* illustrate a cluster of edge nodes having a designated edge node that queries for multicast information and distributes the multicast information to other edge nodes in the cluster. The edge nodes in the cluster in turn uses the distributed multicast information to identify next-hops or destinations for a particular multicast group. As illustrated, the edge nodes 111-115 of the cluster 110 are in a same LAN or L2 segment. Thus, IGMP protocol does not allow multiple edge nodes in the cluster 110 to query and receive IGMP reports. However, the edge node 114 is the designated edge node for launching IGMP queries and receiving IGMP reports carrying multicast information on behalf of other edge nodes in the cluster 110.

Figure 2A:
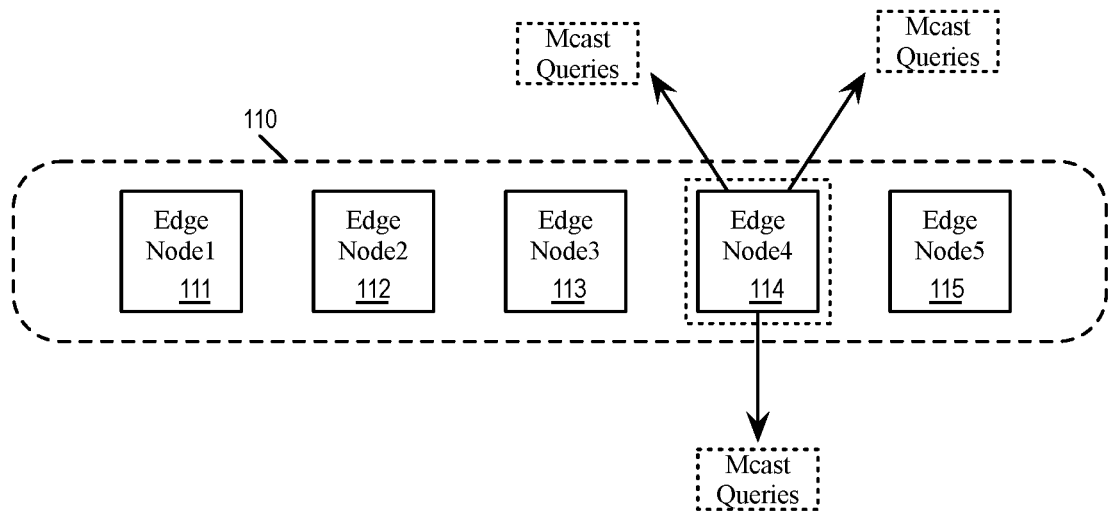
FIGS. 2a-d illustrate a cluster of edge nodes having a designated edge node that queries for multicast information and distributes the multicast information to other edge nodes in the cluster.

FIG. 2*a* shows the edge node 114 sending multicast queries (e.g., IGMP queries) for multicast information. Multicast information may identify the members of a particular multicast group. The multicast information may also include membership information for multiple different multicast groups. In some embodiments, different multicast groups may have different designated edge node in the cluster based on a hash of the identifier of the multicast group (e.g., the multicast group IP).

Figure 2B:
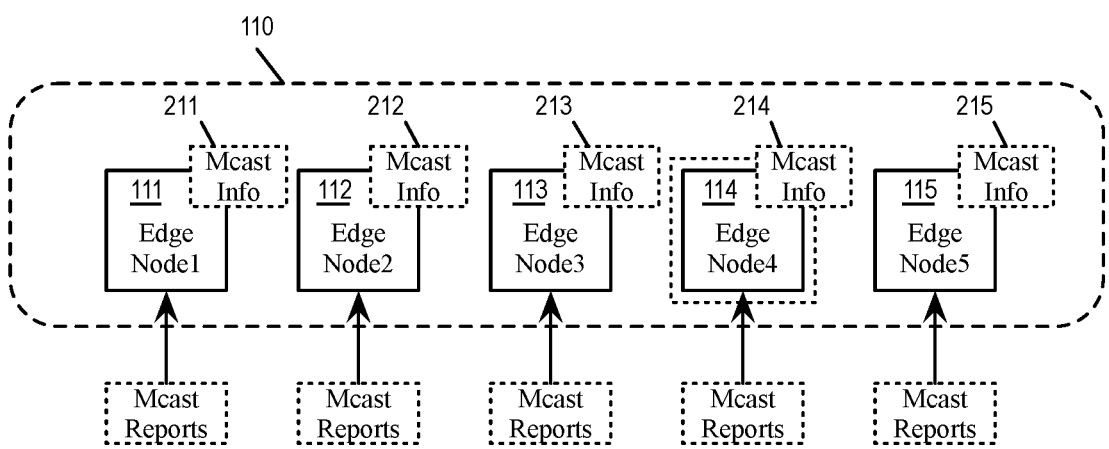

FIG. 2*b* shows the edge nodes in the cluster of edge nodes 110 receiving multicast report (e.g., in IGMP reports) that are sent in response to the query sent by the designated node 114. In some embodiments, when multicast reports of multiple multicast groups are present, at least two (or all) of the edge nodes in the cluster 110 will receive the multicast reports. In some embodiments, multicast reports of different multicast groups may be processed by different edge nodes in the cluster. In some of these embodiments, an edge node is selected from a list of edge nodes to receive a multicast report based on the multicast group identifier of the multicast report (e.g., by hashing the multicast group identifier). The edge nodes of the cluster of edge nodes that receive the multicast report then compiles membership information for one or more multicast groups based on the received multicast reports. As illustrated, the edge nodes 111-115 have respectively compiled multicast information 211-215.

For some embodiments, an edge node or router using IGMP protocol has at least the following components: first, an IGMP snooping process at data plane; second, an actual IGMP protocol process at control plane. IGMP report packets reach all the edges nodes in cluster 110. The IGMP snooping process of an edge node or router builds the multicast table (Multicast FIB) based on the IGMP reports. The IGMP protocol process applies the ECMP and build the multicast information if the next-hop indicated by from hash of the multicast group identifier matches with the local IP of the edge node or router (i.e., to make sure that it is a designated edge node for that multicast group) and generates the PIM request/join.

Figure 2C:
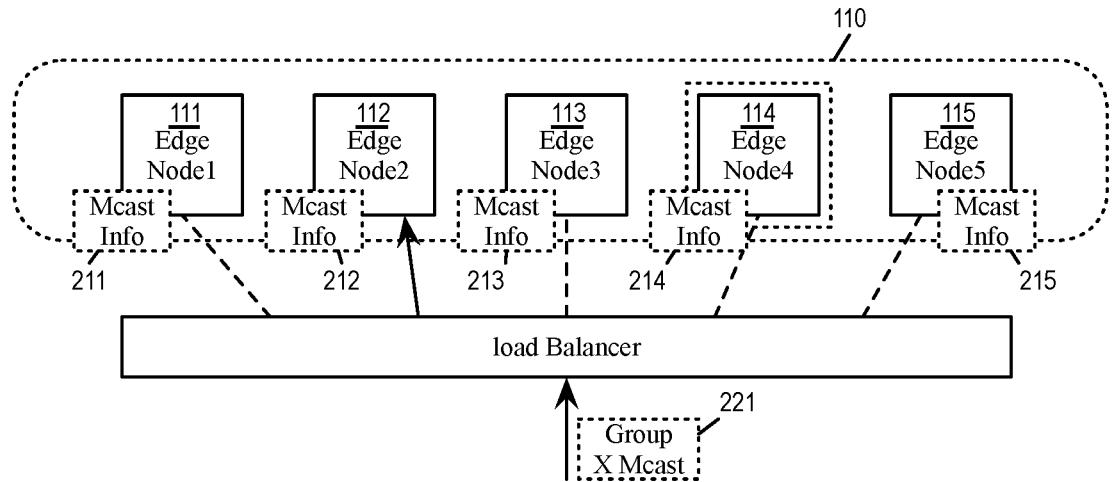

FIG. 2c shows an edge node 112 in the cluster 110 is used to forward a multicast packet 230 for a multicast group X, as the multicast information 212 compiled by the edge node 112 based on the received multicast reports is used to identify the receiver(s) of the multicast group X. In addition, the edge node 112 is selected to forward multicast packet for group X based on a hash of the group identifier of group X.

Figure 2D:
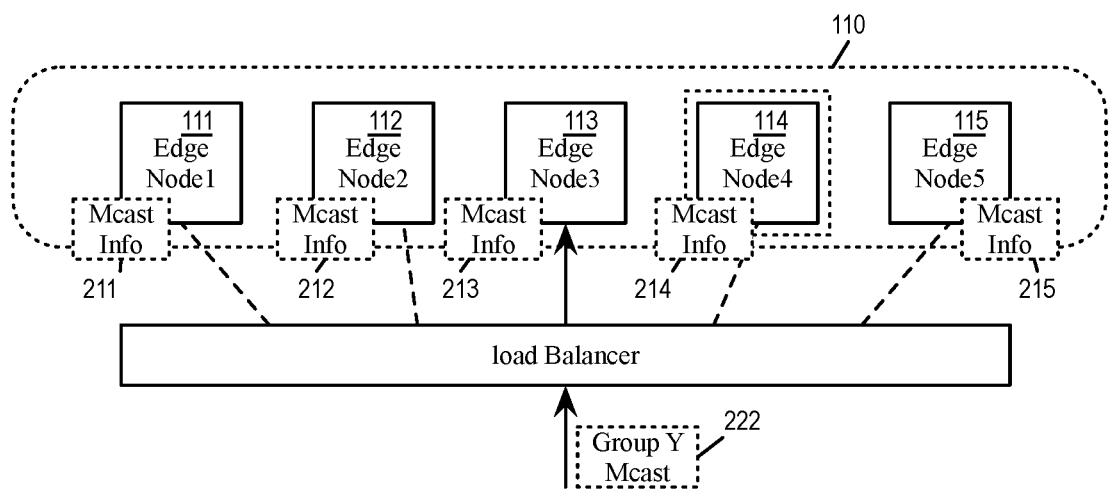

FIG. 2d shows an edge node 113 in the cluster 110 is used to forward a multicast packet 230 for a multicast group Y, as the multicast information 213 compiled by the edge node 113 based on the received multicast reports is used to identify the receiver(s) of the multicast group Y. In addition, the edge node 113 is selected to forward multicast packet for group Y based on a hash of the group identifier of group Y.

Thus, data traffic (including multicast reports) of different multicast groups may be processed by different edge nodes of a same cluster or a same network segment. This is different from standard IGMP snooping, in which data traffic of all multicast groups will go to the same node in a network segment that send the IGMP query.

Figure 3:
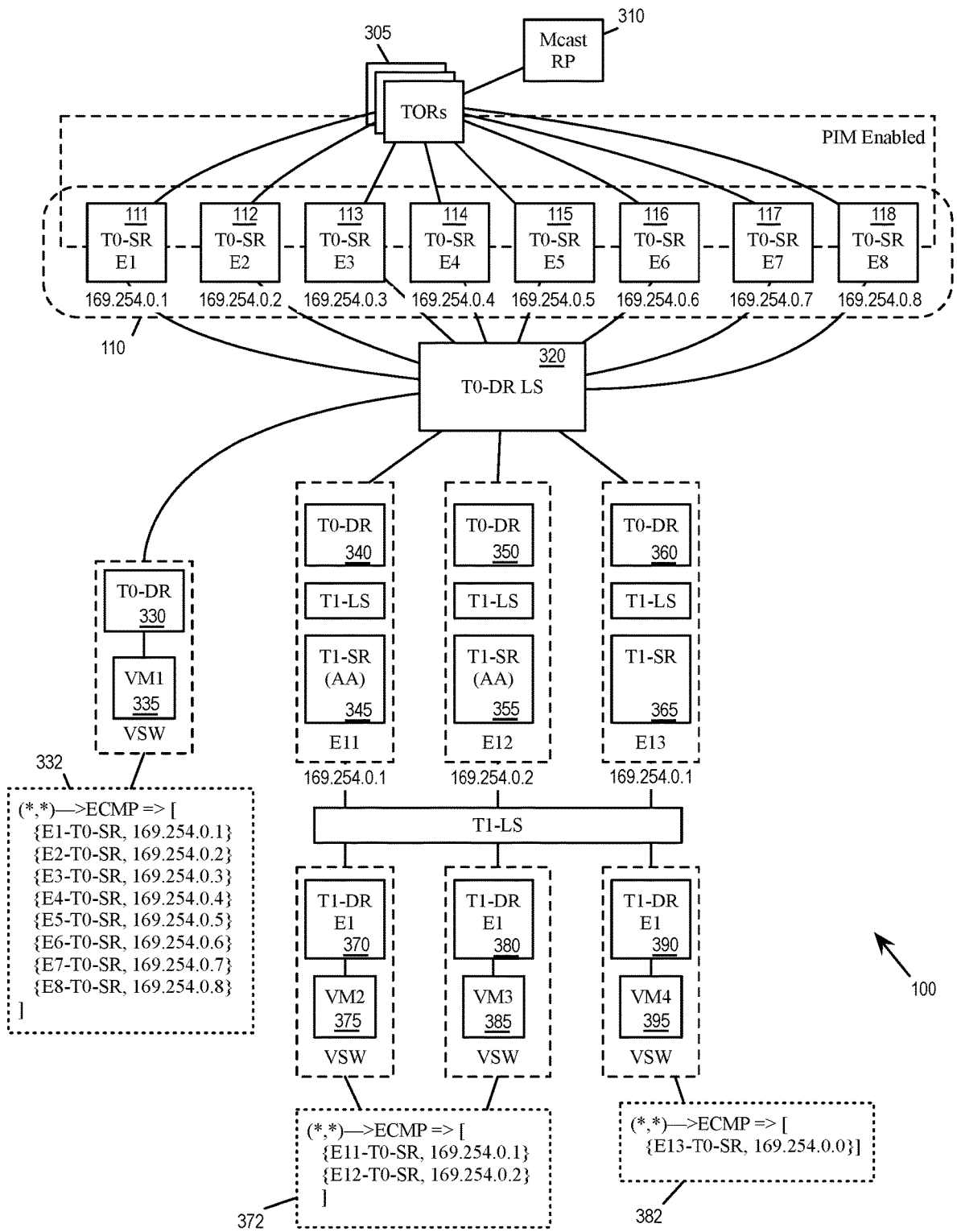
FIG. 3 illustrates the example network virtualization environment having a two-level hierarchy of edge routing services.

FIG. 3 illustrates the example network virtualization environment having a two-level hierarchy of edge routing services. Specifically, the figure shows the example network virtualization environment 100 in greater detail. As illustrated, the network virtualization environment includes the cluster of edge nodes 110 in the service routers, which are provider level service routers (T0-SRs). Each edge node is associated with an IP address, for example, the edge node 111 (E1) has an interface IP address 169.254.0.1, the edge node 112 (E2) has an interface IP address 169.254.0.2, the edge node 118 (E8) has an interface IP address 169.254.0.8, etc. The service routers provide edge services between routers and resources in the network virtualization domain (that uses a network virtualization manager to implement the distributed routers and service routers) and the routers in a physical network domain. The routers in the physical network domain includes one or more top-of-rack (ToR) physical routers 305, which provide connection to a rendezvous point (RP) 310 of multicast traffic. The RP 310 acts as the meeting place for sources and receivers of multicast data. In a PIM-SM network, sources send their traffic to the RP. This traffic is then forwarded to receivers down a shared distribution tree.

A particular T0 distributed router 320 is used as a logical switch among the T0 service routers and several T0 distributed routers 330, 340, 350, and 360. The T0 distributed router 330 provides connectivity to a T0 DCN 335 (VM1) as they are both implemented by host machines of a virtualization software or hypervisor. The T0 distributed router 340 provides connectivity to a T1 service router 345 to implement a T1 level edge node E11. The T0 distributed router 350 provides connectivity to a T1 service router 355 to implement a T1 level edge node E12. The T1 service router 345 and 355 jointly support multicast in active/active mode. The T0 distributed router 360 provides connectivity to a T1 service router 365 to implement a T1 level edge node E13.

The T1 service routers 345, 355, and 365 are interconnected with several T1 distributed routers 370, 380, and 390 by a T1 level switch. The T1 distributed routers 370, 380, 390 provide connectivity to T1 level workload DCNs 375 (VM2), 385 (VM3) and 395 (VM4), respectively, as the distributed routers and the DCNs are implemented by host machines of a virtualization software or hypervisor.

In some embodiments, the designated edge node sends PIM join to the uplink/upstream physical routers, and converts incoming PIM join from the uplink/upstream physical routers into IGMP join for other edge nodes in the cluster. As illustrated in FIG. 3, a single T0 distributed router 320 is used as a switch among the edge nodes 111-118 of the cluster 110. Thus, all edge nodes in the cluster receive the IGMP join from T1 routers connected to the switch. This information is used to build a datapath flow cache on all the edge nodes in the cluster, but only the designated edge node (e.g., 114) sends the PIM join to the upstream physical router to comply with the requirement of the multicast protocol.

In some embodiments, load balancing is performed across the cluster of edge nodes 111-118 for multicast traffic in and out of the network virtualization environment 100. To implement the load balancing, the T0 distributed routers implemented by virtualization software learn about the IGMP querier through IGMP learning. The routing control plane runs only one IGMP querier at the designated edge node 114 (which is a T0-SR). So the T0- and T1-distributed routers may learn about the one multicast querier and as well as the multicast receivers across the edge cluster 100.

The virtualization software and the distributed routers learn only one of the multicast-router interfaces from the IGMP query packet, so this information is not enough to do the load balancing. In order to support the active/active (AA) load balancing, each T0/T1 distributed router is provided information regarding all T0-SRs as a list of multicast-router. For some embodiments, this list of multicast-router interfaces is unlike standard outgoing interface list, but instead is a list of SR interfaces that includes a list of next-hops for equal-cost multi-path (ECMP) routing. In some embodiments, the list of ECMP next-hops are included in a look-up table (LUT) at the distributed router, and the distributed router uses the ECMP next-hop LUT to send the South-to-North (S→N) multicast streams from the distributed router towards physical routers (e.g., multicast rendezvous point (RP) or source specific multicast (SSM) receivers.) In some embodiments, the ECMP next-hop LUT of is part of a multicast data traffic table or multicast forwarding information base (MFIB) table at the distributed router. Multicast packets having a corresponding forwarding entry in the MFIB table are fast switched by the MFIB table. Multicast packets without a forwarding entry in the MFIB table will be process-switched by the MFIB table. In the example of FIG. 3, the T0 distributed router 330 uses a multicast data traffic table 332, the T1 distributed routers 370 and 380 use a multicast data traffic table 372, and the T1 distributed router 390 uses a multicast data traffic table 382.

A multicast data traffic table may have three types of entries for three types of multicast traffic look-ups: (i) (S,G) lookup entries, (ii) (*,G) lookup entries, and (iii) (*,*) lookup entries. The (S,G) and (*,G) lookup entries correspond to shared tree entries and source tree entries used by PIM. A (*,*) lookup entry may correspond to a list of edge nodes that can be used as ECMP next-hop for load balancing. A (*,*) lookup entry may therefore also be referred to as a load balancing entry. (In FIG. 3, the multicast traffic tables illustrate only (*,*) entries, but they may also have (S,G) entries and (*,G) entries that are not illustrated.) For example, the multicast data traffic table 332 of the T0-DR 330 has a load balancing entry (or *,* entry) that corresponds to a list of IP addresses of the edge nodes 111-118 in the cluster 110. In other words, instead of copying the packet on all outgoing ports, multicast traffic arriving at T0-DR 330 will be load balanced with all active PIM T0-SRs as ECMP next-hops. As another example, in the multicast data traffic table 372, the load balancing (*,*) entry is mapped to all multicast active T1-SRs, namely E11 and E12 (which has interface IPs 169.254.0.1 and 169.254.0.2).

When traffic generated by a VM or DCN in T0/T1 logical router reaches a T1 or T0 distributed router, the traffic will hit the (*,*) entry in the MFIB lookup of the distributed router. The MFIB lookup of the distributed router in turn returns a list of ECMP next-hops that identifies the backplane IPs of service routers or edge nodes (e.g., the T1-SRs and T0-SRs or the edge nodes in the cluster 110.) A hash is applied to the destination group IP of the packet to obtain a hash value that is used to select one of the T0-SR/T1-SR backplane IPs as the next-hop. In some embodiments, only the multicast group IP and no other field or information from the packet will be considered for hashing. An Address Resolution Protocol (ARP) entry for the selected next-hop IP (backplane IP) is derived from an ARP table, and the corresponding MAC address of the next-hop IP will be used to find the T0-SR/T1-SR edge nodes. The same load balancing procedure is applicable to edge nodes as well. Namely, an edge node may perform load balancing based on a MFIB lookup table that stores a list of next-hops.

In some embodiments, an IGMP report that is sent to an T0-SR (e.g., the service router of the designated edge node 114) in response to an IGMP query is also load balanced. In some embodiments, the datapath uses the header of the IGMP report to extract the group address when it applies the hashing, so both IGMP report and multicast data stream will reach the same T0-SR. IGMP report will be distributed to all T0-DR edges and all edge nodes will learn about the receiver of the multicast traffic. Group IP extracted from the packet's destination IP is used as a hash key to compute the ECMP hash. Network entities based on virtualization software (DCNs, logical routers, etc.) as well as edge nodes use the same hash key. This same hash key will be used for the IGMP packet as well. A group IP or destination IP will be extracted from IGMP header depending on the IGMP type. Thus, in some embodiments, the designated edge node 114 is selected from the cluster of edge nodes by using the multicast group IP as a hash key.

Having the same hash key for both multicast streams and multicast report ensures consistent load balancing for streams and reports, which also prevents multicast traffic from taking a longer path or being unnecessarily duplicated. For example, for the network topology shown in the example of FIG. 3, if VM2 on T1-DR sends the traffic for a multicast group 225.1.1.1, the virtualization software may choose edge node E11 (at T1-SR). T0-DR in E11 may then chooses E4 (T0-SR). E4 sends a PIM-join packet to RP. The multicast traffic flow in this case is VM2→T1-DR→E11 (at T1-SR)→E11 (at T0-DR) E4 (at T0-SR)→PIM register to RP. (A PIM register packet notifies the RP that the source is sending traffic towards a multicast group address and is a first multicast packet from the source to the RP.) (In some embodiments, if both the selected T1-DR and the selected T0-SR are local routers of the same edge, then the local T0-SR will be chosen in unicast and not multicast.)

When VM2 on T1-DR is the receiver, the IGMP reports are sent to all T0-DR. However, if ECMP were inconsistent (e.g., due to inconsistent hashing), the IGMP report may instead reach edge node E3 (at T0-SR) (instead of E4), then E3 sends the PIM-join packet to the RP, then traffic goes through RP. T0-DR in the meantime performs snooping to learn the multicast receivers. As a result, E11 (at T0-DR) may send multicast traffic to E13 (at T1-SR) and E13 (at T1-SR) will send traffic to VM2 via virtualization software. In contrast, had ECMP been consistent, E11 would send multicast traffic directly to VM2 through virtualization software without going through E13.

In some embodiments, in order to keep load balancing consistent between edge nodes (or service routers) and distributed routers (and other network entities implemented by host machines running virtualization software), the edges and the distributed routers all use a list of next-hop ECMP IPs that is sorted in a same order (ascending order, descending order, etc.). A hash value is used to select the next-hop from this list of next-hop ECMP IPs, and the edge nodes and the distributed routers all use only the multicast group IP in the multicast packets as the hash key for a JHash function and no other fields in the packets. In some embodiments, the edge nodes and distributed routers receive the list of next-hops from the control plane. In some embodiments, the edge nodes and the distributed routers construct the list of next-hops based on multicast membership information received from the designated edge nodes or by snooping multicast traffic.

Figure 4:
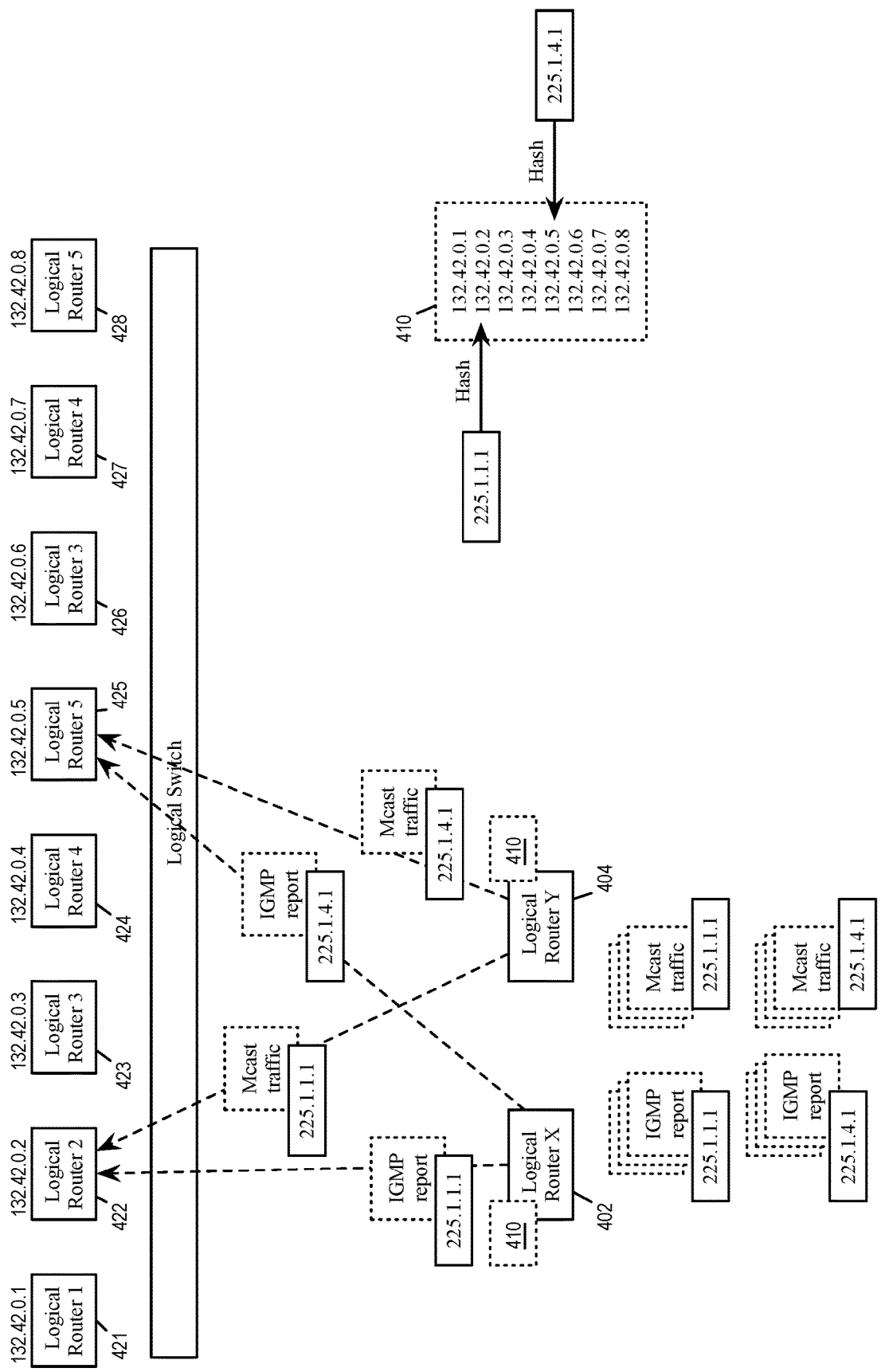
FIG. 4 conceptually illustrates consistent load balancing for multicast traffic by logical routers.

FIG. 4 conceptually illustrates consistent load balancing for multicast traffic by logical routers. The logical routers may refer to any service routers or distributed routers described above by reference to FIGS. 1-3, including both T1 and T0 routers. In the figure, a logical router X 402 and a logical router Y 404 both receive packets having multicast group identifiers. These packets may include responses to multicast inquiries bearing membership information (e.g., IGMP reports) or actual multicast data traffic.

In order to ensure consistency of load balancing, the lists of next-hops used by different logical routers would identify a same list of next-hops and in the same order. In the example of FIG. 4, both the logical routers 402 and 404 use a same list of next-hops 410 for forwarding multicast packets. The list of next-hops 410 list IP addresses that correspond to logical routers 421-428 (132.42.0.1 through 132.42.0.8). The logical routers X and Y may receive the same list of next-hops from the control plane. The logical routers X and Y may also arrive at the same list by snooping the multicast traffic in the network, and then sort their own list of next-hops by the same criteria (e.g., ascending, descending). In some embodiments, the list of next-hops used by a logical router is the same as the MFIB table of the logical router.

Since the logical router X 402 and the logical router Y 404 use the same list of next-hops, they would choose the same next-hop when the same hash key is used to select the next-hop. As mentioned, in some embodiments, the logical routers use only the identifier of the multicast group as the hash key for selecting the next-hop and use no other information in the packets as hash key. In the example of FIG. 4, multicast packets having multicast group IP "225.1.1.1" are hashed to select the logical router 422 as the next-hop, while multicast packets having multicast group IP "225.1.4.1" are hashed to select logical router 425 as the next-hop. This is regardless of whether the packet is sent by logical router X 402 or logical router Y 404, or whether the packet is an IGMP report or actual multicast traffic or data stream.

Figure 5:
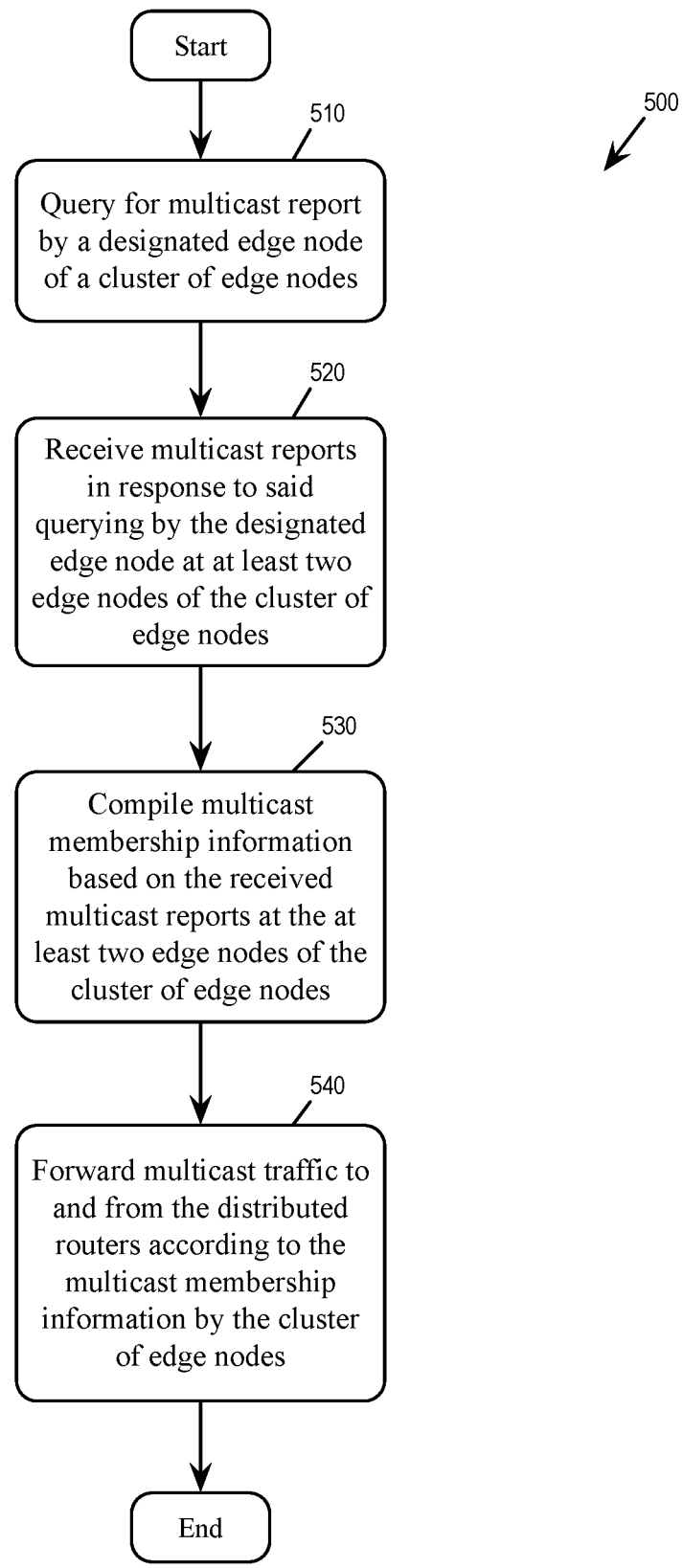
FIG. 5 conceptually illustrates a process for using a designated node to query and distribute multicast information to enable using a cluster of edge nodes to send and receive multicast traffic for a network virtualization environment.

For some embodiments, FIG. 5 conceptually illustrates a process 500 for using a designated node to query and distribute multicast information to enable using a cluster of edge nodes to send and receive multicast traffic for a network virtualization environment. The designated edge node is one of multiple edge nodes in a cluster of edge nodes (e.g., the cluster of edge nodes 110) for sending data from one or more distributed routers to one or more uplink/upstream physical routers and for receiving data from the physical routers to the distributed routers. Each distributed router is implemented by virtualization software running on one or more host machines in a datacenter.

The process 500 starts when the designated edge node queries (at 510) for multicast reports (e.g., IGMP reports) regarding membership information for one or more multicast groups. The cluster of edge nodes are in a same LAN segment, and the designated edge node is the only edge node of the cluster that queries the multicast membership information for a particular multicast group. In some embodiments, a multicast group identifier is used as a hash key to select an edge node from the list of edge nodes as the designated edge node such that different multicast groups may have different designated edge nodes.

At 520, at least two (or all) edge nodes of the cluster of edge nodes receives multicast reports in response to the query by the designated edge node. In some embodiments, an edge node is selected from the list of edge nodes to receive a multicast report based on a multicast group identifier of the multicast report (e.g., by hashing the multicast group identifier). The edge nodes of the cluster of edge nodes that receive the multicast report then compiles (at 530) membership information for one or more multicast groups based on the received multicast reports.

The cluster of edge nodes forward (at 540) multicast traffic to and from the distributed routers according to the membership information. In some embodiments, a distributed router uses a look-up table (MFIB) that returns a list of edge nodes in the cluster of edge nodes as available as next-hop (for load balancing or ECMP) for forwarding multicast packets to the uplink/upstream physical routers, and the look-up table is generated based on the membership information distributed by the designated edge node. In some embodiments, the edge nodes in the cluster and the distributed routers have an identical list of next-hops for multicast traffic. In some embodiments, a multicast group identifier is used as a hash key to select an edge node from the list of edge nodes for forwarding the multicast packets to the uplink/upstream physical routers.

Figure 6:
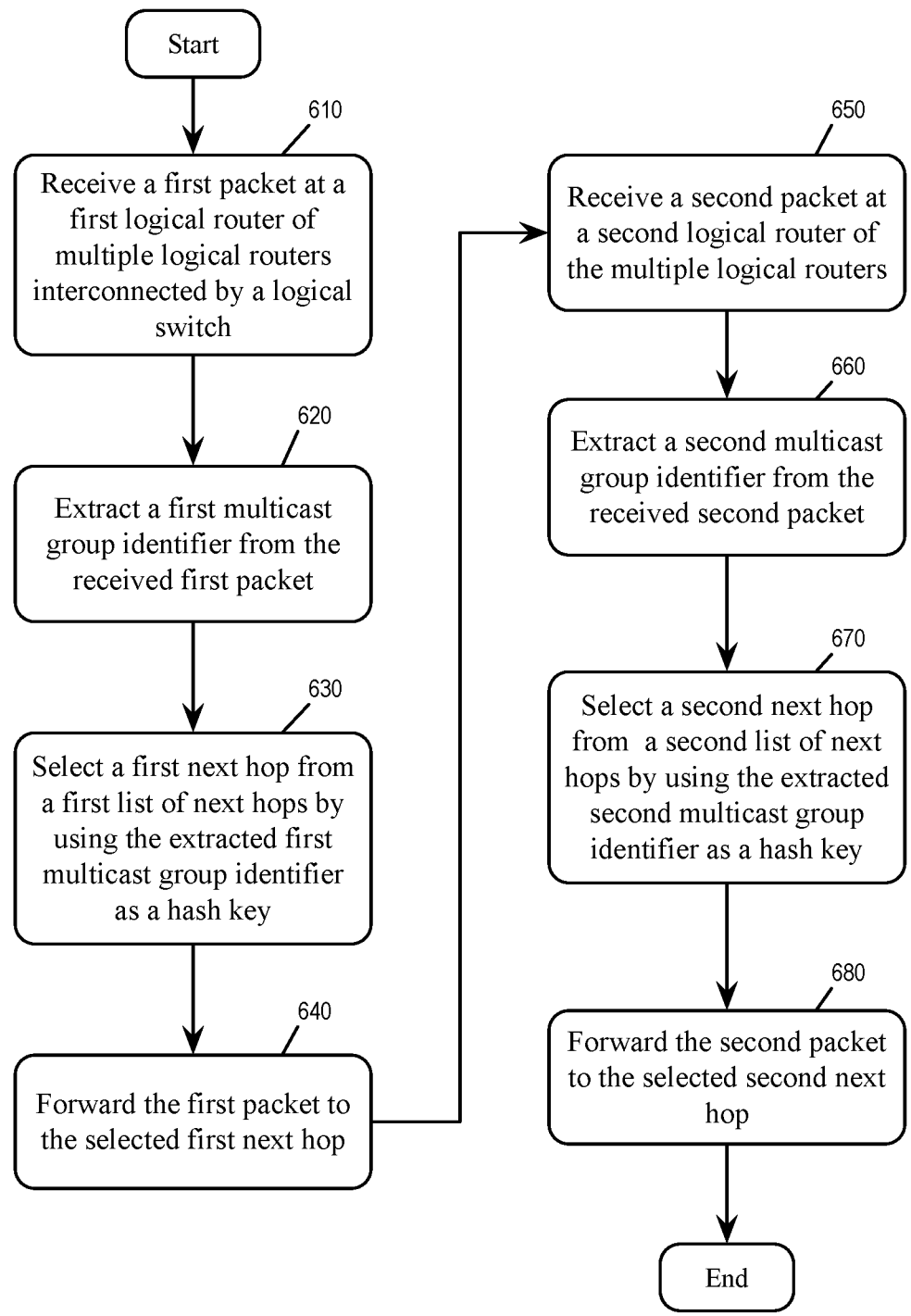
FIG. 6 conceptually illustrates a process for ensuring consistency in load balancing when logical routers forward multicast packets in a network virtualization environment.

For some embodiments, FIG. 6 conceptually illustrates a process 600 for ensuring consistency in load balancing when logical routers forward multicast packets in a network virtualization environment. The logical routers may include distributed routers or service routers that are implemented by virtualization software running on one or more host machines in a datacenter. The logical routers include first and second logical routers that are interconnected by a logical switch. The logical routers and the logical switch interconnecting the logical routers are implemented by host machines running virtualization software.

The process starts when a first logical router receives (at 610) a first packet at a first logical router. The first packet may be a response to a multicast query (e.g., IGMP report) or a packet of a multicast data stream. The first logical router extracts (at 620) a first multicast group identifier from the received packet.

The first logical router selects (at 630) a first next-hop from a first list of next-hops by using the extracted first multicast group identifier as a hash key. Only the first multicast group identifier and no other information in the first packet is used to select the first next-hop. The second logical router of the plurality of logical routers has a second list of next-hops that identifies a same set of next-hops as the first list of next-hops and in the same order as the first list of next-hops. The first list of next-hops includes IP addresses of edge nodes in a cluster that are interconnected with the logical routers through the logical switch. The edge nodes handle data traffic between the logical routers and physical routers external to the datacenter.

The first logical router forwards (at 640) the received packet to the selected first next-hop. The first logical router may receive another packet and select a next-hop from the first list of next-hops based on the multicast group identifier of the other packet, and then forward the packet based on the selected next-hop. If the multicast group identifier of the other packet is the same as the multicast group identifier of the first packet, the selected next-hop will be the same as the next-hop selected for the first packet, even if this another packet is an IGMP report while the first packet is a multicast data stream.

The second logical router receives (at 650) a second packet at the second logical router. The first packet and the second packet may be different types of multicast packets. For example, the first packet is a response to a multicast query (e.g., IGMP report) and the second packet is a packet of a multicast data stream.

The second logical router extracts (at 660) a second multicast group identifier from the received packet. The second logical router selects (at 670) a second next-hop from the second list of next-hops by using the extracted second multicast group identifier as a hash key. Only the second multicast group identifier and no other information in the second packet is used to select the second next-hop. Thus, when the first multicast group identifier is identical to the second multicast group identifier, the first next-hop is the same as the second next-hop. The second logical router forwards (at 680) the second packet to the selected second next-hop. The process 600 then ends.

Figure 7:
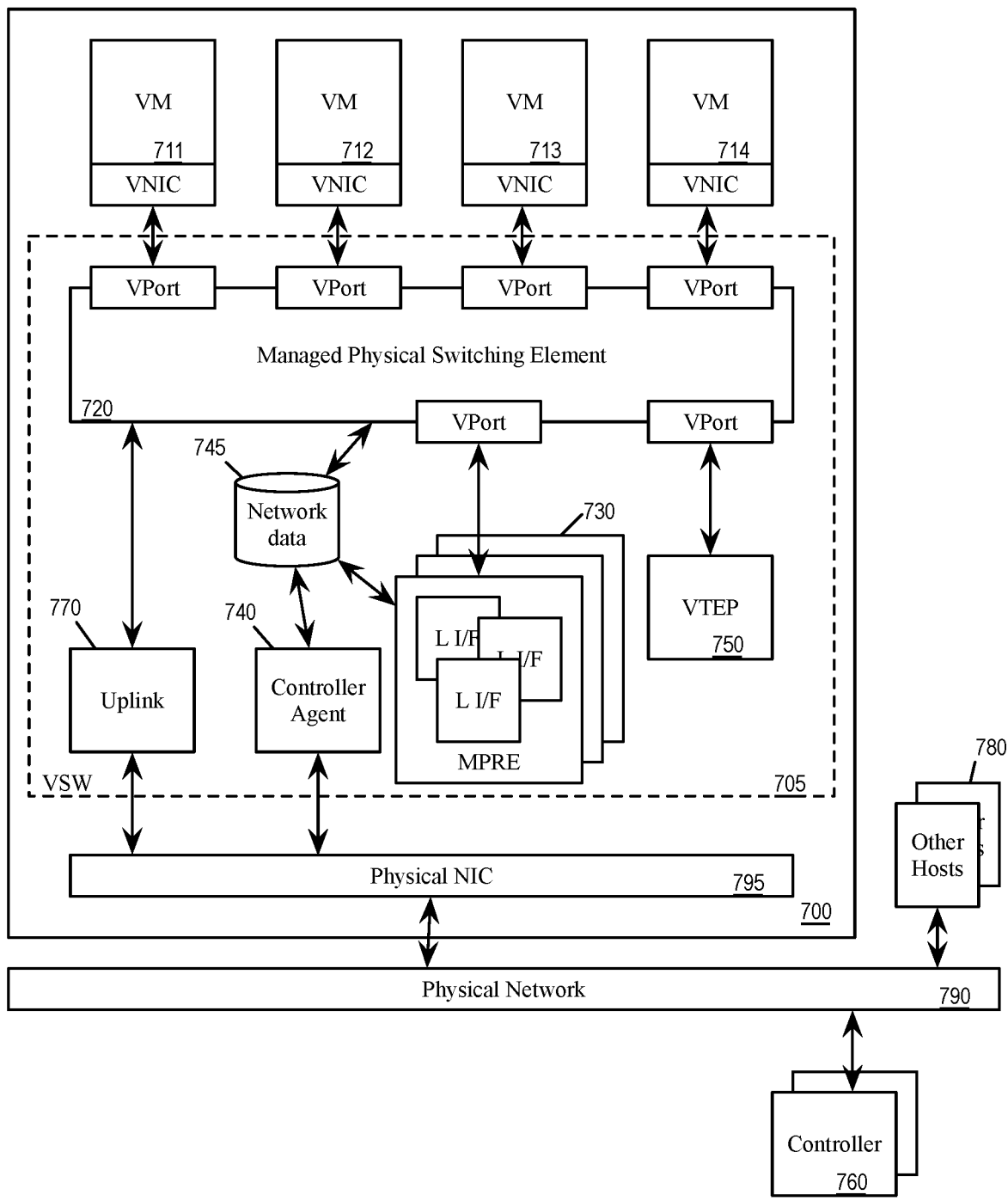
FIG. 7 illustrates a computing device that serves as a host machine that runs virtualization software.

In some embodiments, logical switches, logical routers such as service routers and distributed routers may be implemented by a host machine that is running virtualization software, serving as a virtual network forwarding engine. Such a virtual network forwarding engine is also known as managed forwarding element (MFE), or hypervisors. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), and some of these physical forwarding elements are managed physical switching elements (MPSEs) for performing L2 switching operations for a logical switching element (LSE). FIG. 7 illustrates a computing device 700 that serves as a host machine that runs virtualization software for some embodiments of the invention.

As illustrated, the computing device 700 has access to a physical network 790 through a physical NIC (PNIC) 795. The host machine 700 also runs the virtualization software 705 and hosts VMs 711-714. The virtualization software 705 serves as the interface between the hosted VMs and the physical NIC 795 (as well as other physical resources, such as processors and memory). Each of the VMs includes a virtual NIC (VNIC) for accessing the network through the virtualization software 705. Each VNIC in a VM is responsible for exchanging packets between the VM and the virtualization software 705. In some embodiments, the VNICs are software abstractions of physical NICs implemented by virtual NIC emulators.

The virtualization software 705 manages the operations of the VMs 711-714, and includes several components for managing the access of the VMs to the physical network (by implementing the logical networks to which the VMs connect, in some embodiments). As illustrated, the virtualization software includes several components, including a MPSE 720, a set of MPREs 730, a controller agent 740, a network data storage 745, a VTEP 750, and a set of uplink pipelines 770.

The VTEP (virtual tunnel endpoint) 750 allows the host machine 700 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 700 sends a data packet (e.g., an Ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 770.

The controller agent 740 receives control plane messages from a controller or a cluster of controllers. In some embodiments, these control plane message includes configuration data for configuring the various components of the virtualization software (such as the MPSE 720 and the MPREs 730) and/or the virtual machines. In the example illustrated in FIG. 7, the controller agent 740 receives control plane messages from the controller cluster 760 from the physical network 790 and in turn provides the received configuration data to the MPREs 730 through a control channel without going through the MPSE 720. However, in some embodiments, the controller agent 740 receives control plane messages from a direct data conduit (not illustrated) independent of the physical network 790. In some other embodiments, the controller agent receives control plane messages from the MPSE 720 and forwards configuration data to the router 730 through the MPSE 720.

The network data storage 745 in some embodiments stores some of the data that are used and produced by the logical forwarding elements of the host machine 700, logical forwarding elements such as the MPSE 720 and the MPRE 730. Such stored data in some embodiments include forwarding tables and routing tables, connection mapping, as well as packet traffic statistics. These stored data are accessible by the controller agent 740 in some embodiments and delivered to another computing device that is operating the troubleshooting system. The network data storage 745 may store a multicast data traffic table (e.g., MFIB) that is used to select a next-hop for load balancing of multicast traffic.

The MPSE 720 delivers network data to and from the physical NIC 795, which interfaces the physical network 790. The MPSE also includes a number of virtual ports (vPorts) that communicatively interconnects the physical NIC with the VMs 711-714, the MPREs 730 and the controller agent 740. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 790 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 730 perform L3 routing on data packets received from a virtual port on the MPSE 720. In some embodiments, this routing operation entails resolving L3 IP address to a next-hop L2 MAC address and a next-hop VNI (i.e., the VNI of the next-hop's L2 segment). Each routed data packet is then sent back to the MPSE 720 to be forwarded to its destination according to the resolved L2 MAC address. This destination can be another VM connected to a virtual port on the MPSE 720, or a reachable L2 network element on the physical network 790 (e.g., another VM running on another host, a physical non-virtualized machine, etc.).

As mentioned, in some embodiments, aIVIPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSES are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 730 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 770 relays data between the MPSE 720 and the physical NIC 795. The uplink module 770 includes an egress chain and an ingress chain that each performs a number of operations. Some of these operations are pre-processing and/or post-processing operations for the MPRE 730.

As illustrated by FIG. 7, the virtualization software 705 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 720, and hence a same L2 MAC address (vMAC or pMAC). In some other embodiments, each different MPRE belonging to a different tenant has its own port to the MPSE.

The MPSE 720 and the MPRE 730 make it possible for data packets to be forwarded amongst VMs 711-714 without being sent through the external physical network 790 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 700 (and its virtualization software 705) is able to direct packets of different logical networks to their correct destinations and effectively segregates traffic of different logical networks from each other.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
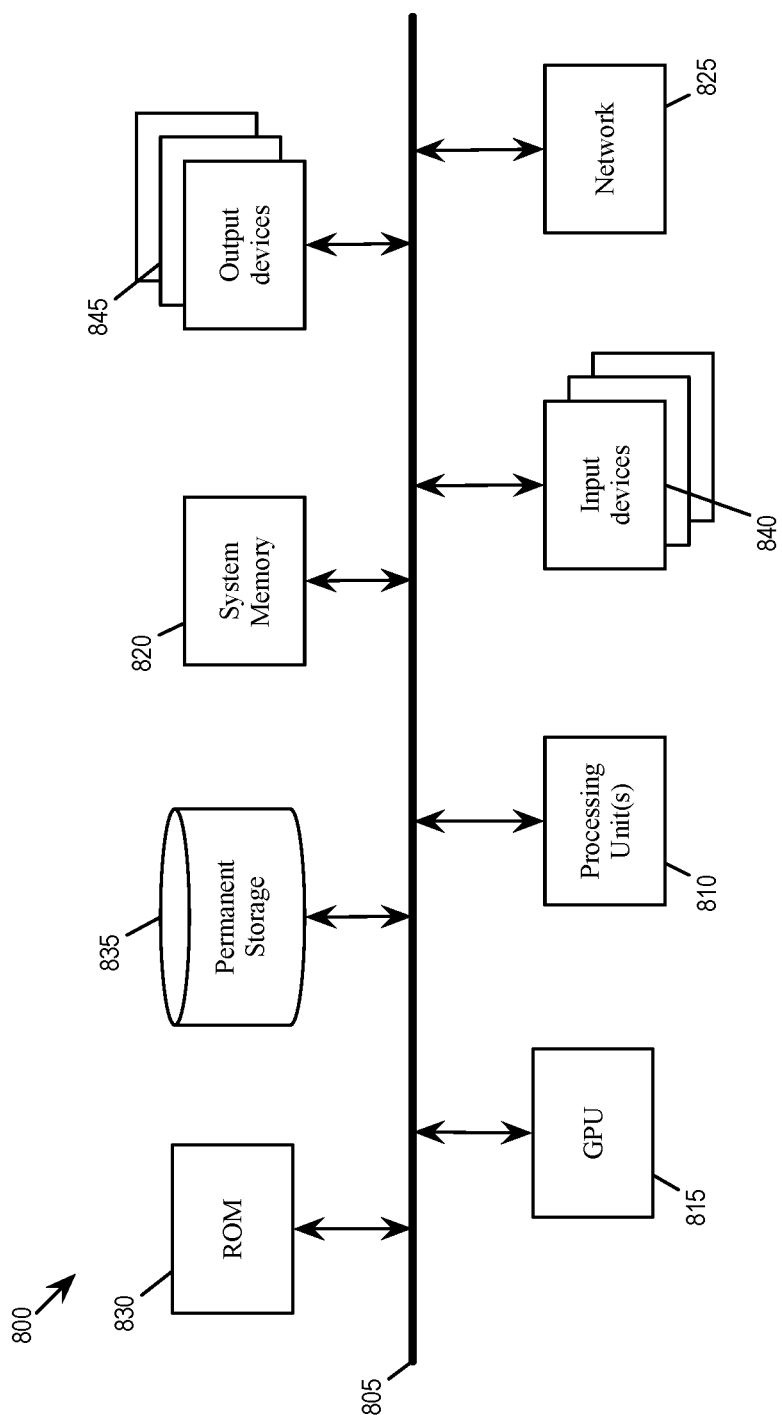
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, and managers. As such, it can be used to execute any of the above-described processes. This computer system includes various types of non-transitory machine-readable media and interfaces for various other types of machine-readable media. Computer system 800 includes a bus 805, processing unit(s) 810, a system memory 820, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 820, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 820 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 820, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    receiving first and second packets at a first logical router, wherein the first logical router is one of a plurality of logical routers that are interconnected by a logical switch;
    extracting first and second multicast group identifiers from the received first and second packets respectively;
    selecting first and second next-hops from a first list of next-hops by using the extracted first and second multicast group identifiers respectively as hash keys, wherein a second logical router of the plurality of logical routers has a second list of next-hops that identifies a same set of next-hops as the first list of next-hops and in the same order as the first list of next-hops; and
    forwarding the received first packet to the selected first next-hop and the received second packet to the selected second next-hop,
    wherein when the first multicast group identifier is identical to the second multicast group identifier, the first next-hop is the same as the second next-hop,
    wherein the first packet is a response to a multicast query and the second packet is a packet of a multicast data stream.

2. The method of claim 1, wherein only the first multicast group identifier and no other information in the first packet is used to select the first next-hop.

3. A method comprising:
    receiving (i) a first packet at a first logical router, and (ii) a second packet at a second logical router, wherein each logical router is one of a plurality of logical routers that are interconnected by a logical switch;
    extracting (i) a first multicast group identifier from the received first packet and (ii) a second multicast group identifier from the received second packet;
    selecting (i) a first next-hop from a first list of next-hops by using the extracted first multicast group identifier as a first hash key and (ii) a second next-hop from a second list of next-hops by using the extracted second multicast group identifier as a second hash key, wherein the second logical router has a second list of next-hops that identifies a same set of next-hops as the first list of next-hops and in the same order as the first list of next-hops; and
    forwarding the received first packet to the selected first next-hop and the received second packet to the selected second next-hop,
    wherein when the first multicast group identifier is identical to the second multicast group identifier, the first next-hop is the same as the second next-hop,
    wherein the first packet is a response to a multicast query and the second packet is a packet of a multicast data stream.

4. The method of claim 1, wherein the plurality of logical routers and the logical switch interconnecting the logical routers are implemented by host machines running virtualization software.

5. The method of claim 1, wherein the first list of next-hops comprises IP addresses of a plurality of edge nodes in a cluster that are interconnected with the logical routers through the logical switch, wherein the edge nodes handle data traffic between the logical routers implemented by host machines running virtualization software in a datacenter and physical routers external to the datacenter.

6. A computing device comprising:
    one or more processors; and
    a computer-readable storage medium storing a plurality of computer-executable components that are executable by the one or more processors to perform a plurality of actions, the plurality of actions comprising:

receiving first and second packets at a first logical router, wherein the first logical router is one of a plurality of logical routers that are interconnected by a logical switch;

extracting first and second multicast group identifiers from the received first and second packets respectively;

selecting first and second next-hops from a first list of next-hops by using the extracted first and second multicast group identifiers respectively as hash keys, wherein a second logical router of the plurality of logical routers has a second list of next-hops that identifies a same set of next-hops as the first list of next-hops and in the same order as the first list of next-hops; and forwarding the received first packet to the selected first next-hop and the received second packet to the selected second next-hop, wherein when the first multicast group identifier is identical to the second multicast group identifier, the first next-hop is the same as the second next-hop, wherein the first packet is a response to a multicast query and the second packet is a packet of a multicast data stream.

7. The computing device of claim 6, wherein only the first multicast group identifier and no other information in the first packet is used to select the first next-hop.

8. A computing device comprising:
one or more processors; and
a computer-readable storage medium storing a plurality of computer-executable components that are executable by the one or more processors to perform a plurality of actions, the plurality of actions comprising:
receiving (i) a first packet at a first logical router and (ii) a second packet at a second logical router, wherein each logical router is one of a plurality of logical routers that are interconnected by a logical switch;

extracting (i) a first multicast group identifier from the received first packet and (ii) a second multicast group identifier from the received second packet;

selecting (i) a first next-hop from a first list of next-hops by using the extracted first multicast group identifier as a first hash key and (ii) a second next-hop from a second list of next-hops by using the extracted second multicast group identifier as a second hash key, wherein the second logical router has a second list of next-hops that identifies a same set of next-hops as the first list of next-hops and in the same order as the first list of next-hops; and forwarding the received first packet to the selected first next-hop and the received second packet to the selected second next-hop, wherein when the first multicast group identifier is identical to the second multicast group identifier, the first next-hop is the same as the second next-hop, wherein the first packet is a response to a multicast query and the second packet is a packet of a multicast data stream.

9. The computing device of claim 6, wherein the plurality of logical routers and the logical switch interconnecting the logical routers are implemented by host machines running virtualization software.

10. The computing device of claim 6, wherein the first list of next-hops comprises IP addresses of a plurality of edge nodes in a cluster that are interconnected with the logical routers through the logical switch, wherein the edge nodes handle data traffic between the logical routers implemented by host machines running virtualization software in a datacenter and physical routers external to the datacenter.

* * * * *